Dec. 12, 1950     M. P. GRAHAM     2,533,928
JOINT ASSEMBLY
Filed March 22, 1946
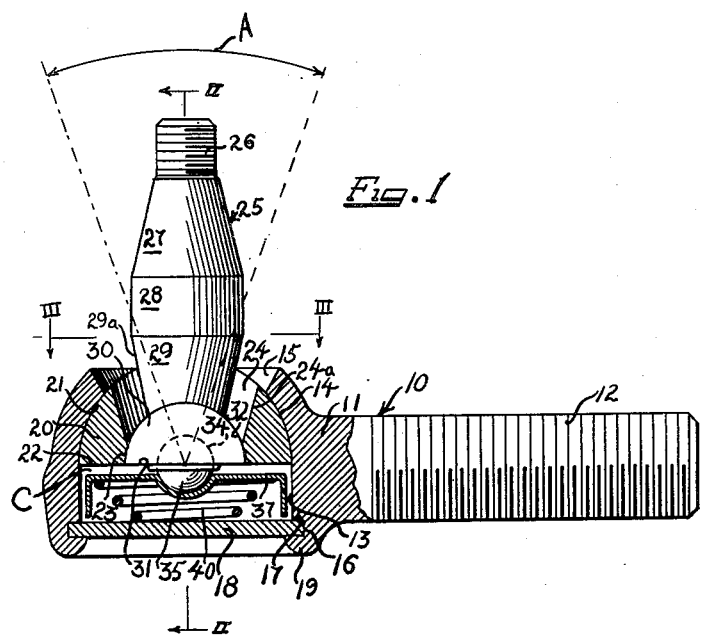
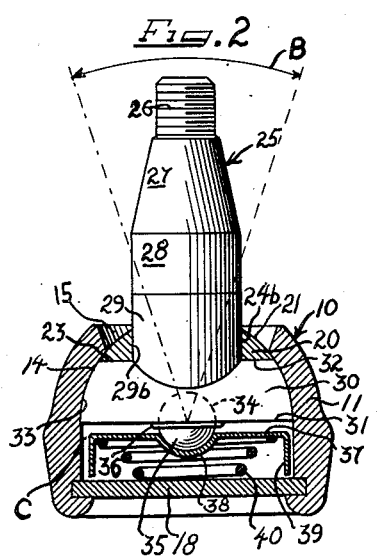
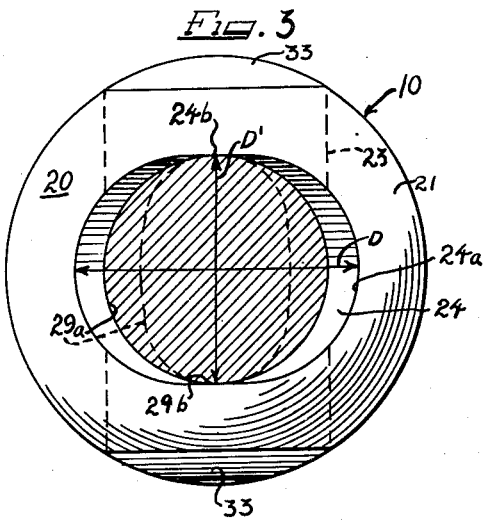
Inventor
MATTHEW P. GRAHAM Patented Dec. 12, 1950

2,533,928

UNITED STATES PATENT OFFICE 2,533,928

JOINT ASSEMBLY

Matthew P. Graham, Detroit, Mich., assignor to Thompson Products, Inc., Cleveland, Ohio, a corporation of Ohio Application March 22, 1946, Serial No. 656,450

7 Claims. (Cl. 287—90)

This invention relates to a joint assembly wherein tilting movements in one plane are accommodated on one pair of bearing surfaces and wherein tilting movements in all other planes are accommodated on another pair of bearing surfaces. Specifically the invention deals with a tie rod type of stud and socket joint especially adapted for the steering linkage of an automotive vehicle wherein a fragmentary ball-shaped bearing is tiltable and rotatable in a socket and carries a stud having a cross bar head tiltable in one plane only in the bearing.

The invention will hereinafter be specifically described as embodied in a joint assembly for a tie rod joint construction but it should be understood that the principles of the invention are generally applicable to joints. Therefore the invention is not limited to the illustrated embodiment.

Tie rod joints are subjected to tilting action in one plane more than in other planes. In tie rod constructions for independently sprung wheels of automotive vehicles the vertical rising and falling movements of the wheels during operation of the vehicle effects increased tilting movements of the tie rod joint studs in one plane. Tilting movements of the studs in other planes is not increased. The increased tilting movement in the one plane increases wear action on the bearing surfaces and if the bearing surfaces must accommodate tilting in all planes, those portions of the surfaces accommodating the repeated and increased tilting in the one plane are soon worn more than the other portions of the surfaces. The unworn surfaces will prevent any automatic wear take-up to accommodate for the wear of the worn localized portions and as a result looseness will soon develop in the joint construction.

According to the present invention a fragmental ball seat or bearing is mounted on the ball-shaped interior bearing wall of the socket or housing. The bearing or seat has an end face in the housing which is longitudinally grooved or recessed to provide an open ended cylindrical rod receiving seat. A hole extends through the bearing or seat in perpendicular relation to the axis of the elongated groove or recess seat. The shank of a stud projects through the hole of the seat and the stud has a cross rod or bar fixed on the end thereof tiltable in the elongated groove or recessed seat of the bearing. The stud shank has slidable contact with opposed side walls of the hole in the bearing to move the bearing therewith during all tilting movements in planes other than a plane normal to the axis of the cross rod or bar. The shank is spaced from end walls defining the hole of the bearing to accommodate tilting of the stud in the bearing in a plane normal to the axis of the cross rod or bar of the stud. As a result of this construction the stud will tilt in the bearing in the plane in which excessive tilting action occurs during usage of the joint while the stud will carry the bearing therewith for tilting of the bearing in the socket or housing in all other planes. Rotation of the stud about its own axis is accommodated by the external bearing wall of the bearing and the internal bearing wall of the socket or housing. A spring urged retainer acts on the stud to continuously maintain the cross bar or rod of the stud in seated engagement in the groove or recessed seat of the bearing and to maintain the bearing in continuous engagement with the bearing wall of the socket or housing.

It is then an object of this invention to provide a joint construction having one pair of bearing surfaces accommodating tilting movements in one plane only and having a second pair of bearing surfaces accommodating tilting movements in all other planes.

A further object of the invention is to provide a joint construction having a first pair of bearing surfaces accommodating tilting movements in one plane only and a second pair of bearing surfaces accommodating all rotating movements of the parts and all tilting movements of the parts in other planes.

A still further object of the invention is to provide a tie rod joint construction with a socket having an internal ball seat, a bearing tiltable and rotatable on said ball seat and a stud in said bearing tiltable in one plane only relative to the bearing and carrying the bearing therewith for co-movement in all other planes.

Another object of the invention is to provide tie rod joint construction embodying a joint stud having an elongated cross head or rod for mounting the stud in a bearing and for accommodating tilting movements of the stud in one plane only.

A still further object of the invention is to provide a joint construction embodying a housing, a bearing tiltable and rotatable in the housing and a stud carried by the bearing wherein the shank of the stud is free to move in one plane only relative to the bearing and engages the bearing for co-movement in all other planes.

Other and further objects of the invention will be apparent to those skilled in the art from the following detailed description of the annexed sheet of drawings which, by way of preferred example, illustrates one embodiment of the invention.

On the drawings:

Figure 1 is a side elevational view with parts in vertical cross section of a joint assembly according to this invention.

Figure 2 is a vertical cross sectional view with parts in end elevation taken along the line II—II of Fig. 1.

Figure 3 is a horizontal cross sectional view with the housing or socket removed and illustrating the bearing in top plan view, taken along the line III—III of Fig. 1.

As shown on the drawings:

The joint 10 of this invention includes a housing 11 having a laterally projecting externally threaded stem 12 for insertion in the end of a tie rod (not shown). The housing 11 has a cylindrical bore 13 extending inwardly from one end thereof to an inwardly converging fragmental spherical bearing wall portion 14. The bearing wall 14 converges to a central aperture 15 in the top of the housing as illustrated in Figs. 1 and 2.

The other end of the bore 13 is counterbored at 16 to provide a shoulder 17. A closure disk 18 is seated in the counterbore 16 against the shoulder 17 and is secured in the housing 11 by spinning over the rim end of the housing around the counterbore 16 to provide an inturned locking flange 19 underlying the peripheral margin of the closure disk. A socket chamber C is thereby provided in the housing 11. This chamber is closed at one end by the closure disk 18.

A fragmental ball-shaped bearing member 20 is mounted in the chamber C of the housing 11 and has an external fragmental spherical bearing wall 21 seated on the wall 14 of the housing in free tiltable and rotatable relation therewith. The bearing 20 has a flat end face 22 in the chamber C. A segmental cylindrical groove or recess 23 is formed in this end face 22 to extend completely across the bearing. The groove or recess 23 thereby has open ends covered by the bearing wall 14 of the housing.

A hole 24 is formed through the bearing 20 perpendicular to the axis of the groove or recess 22 and connecting the bottom of the recess with the apex of the bearing 20. This hole 24 has an elongated cross section with a major diameter D normal to the axis of the groove 23 together with a minor diameter D' parallel to the axis of the groove 23 as best shown in Fig. 3. As shown in Fig. 1, the major diameter portion of the hole 24 tapers as at 24a outwardly from the groove 23 to the apex of the bearing 20 while as shown in Fig. 2 the minor diameter portion of the hole 24 extends perpendicularly as at 24b from the groove 23 to the apex of the bearing. Therefore the hole 24 has straight side walls along its minor diameter D' and has outwardly flaring side walls along its major diameter D. The hole 24 can be formed in the bearing 20 by first drilling a cylindrical hole perpendicular to the axis of the groove 23 and then drilling recesses along the desired angle at opposed sides of the hole.

As shown in Figs. 1 and 2, the bearing 20 extends into the aperture 15 of the housing 11 and the hole 24 communicates freely with the aperture 15.

The joint 10 includes a stud 25 with a shank having an externally threaded reduced diameter cylindrical end portion 26, a frusto conical tapered portion 27 diverging from the end portion 26, a cylindrical portion 28 at the divergent end of the portion 27 and an elliptical neck 29 projecting through the hole 24. A cross rod or head 30 is provided on the end of the neck portion 29. The neck 29 has tapered opposed side wall portions 29a converging from the cylindrical portion 28 to the head and aligned with the major diameter portion D of the hole 24 to be opposed to the tapered portions 24a of the hole. The neck 29 also has straight wall portions 29b disposed in the minor diameter portion $D_1$ of the hole 24 and snugly engaging the walls 24b of the hole to have sliding contact therewith. The cross bar or head 30 on the stud has a flat end face 31 and a semi-cylindrical side wall 32 in bearing engagement with the groove or recess 23 of the bearing 20. The bar or head 30 of the stud has fragmental spherical end faces 33 seated in the open ends of the groove 23 in flush relation with the external bearing wall 21 of the bearing 20 to continue this bearing wall and effectively close the ends of the groove.

A hemi-spherical recess 34 is provided in the end face 31 of the head 30 at the axial center of the stud. A small ball or sphere 35 is partially seated in this recess 34 and has a rim portion 36 bottomed on the end face 31 of the head. The ball 35 thereby provides a semi-spherical projection on the axial center of the bottom of the stud as shown in Figs. 1 and 2.

A retainer 37 is freely disposed in the chamber C of the housing 11 and has a top wall with a fragmental spherical recess 38 in the central portion thereof receiving the ball 35. A skirt 39 depends from the periphery of the top wall of the retainer and a coil spring 40 is disposed within the skirt 39 and held under compression between the top wall of the retainer and the closure disk 18 for the housing. The retainer is thereby spring pressed against the ball 35 to urge the head 30 of the stud in bearing engagement with the groove or recess 23 of the bearing and to hold the bearing in bearing engagement with the wall 14 of the housing.

The stud 25 is free to tilt on the cooperating bearing surfaces provided by the stud head 30 and the groove 23 of the bearing 20 only in a plane normal to the axis of the groove 23 and head 30 as shown in Fig. 1. The neck 29 of the stud can move freely in the hole 24 of the bearing in this plane because the tapered side walls 29a of the neck and the recesses 24a of the hole will accommodate wide angular movement through an angle A before the stud shank will engage the bearing. However, when the stud is tilted in any plane that is not normal to the axis of the groove 23, the neck 29 will carry the bearing 20 with the stud because the neck walls 29b are in engagement with the hole walls 24b. The stud can therefore only move with the bearing in planes that are not normal to the axis of the groove 23 and since the aperture 15 of the housing is kept at a minimum diameter to provide a maximum area for the bearing wall 14, the stud can only tilt through a smaller angle B in planes not normal to the axis of the groove 23 as shown in Fig. 2. The wide angular movement A shown in Fig. 1 however will accommodate the desired degree of angular displacement for the stud in the plane wherein excessive tilting action occurs without necessitating the use of a large aperture in the housing 11.

The bearing 20 can tilt and rotate on the bearing wall 14 of the housing 11 and the end faces 33 of the stud head 30 will tilt and rotate on this bearing wall 11 simultaneously with the bearing.

If wear develops in any of the bearing surfaces the spring urged retainer will automatically take up any clearance produced by this wear and looseness of the joint parts cannot occur. This condition will obtain even though one set of bearing surfaces wears more rapidly than the other set because the wear take-up is progressive and is not impeded by unworn surfaces.

In view of the above descriptions it should be understood that this invention provides a joint assembly especially adapted for steering linkages of automotive vehicles wherein a first pair of bearing surfaces fully accommodate tilting movements of the parts in one plane while a second pair of bearing surfaces accommodate all other movements of the parts.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint construction comprising a housing having an internal bearing wall converging to an aperture and accommodating tilting and rotating movements, a bearing in said housing tiltable on said bearing wall, said bearing having an end face in said housing with a fragmental cylindrical open ended groove therein and an elongated hole through said bearing perpendicular to the axis of the groove, said hole having a major axis normal to the axis of the groove, a stud having a shank projecting freely through the aperture of the housing with a neck portion lying in said hole having a minor axis aligned with the major axis of the hole and a major axis part sized for sliding bearing engagement with a minor axis part of the hole, a cross head in said groove on the end of said stud shank, said head having a cylindrical bearing wall tiltable on said cylindrical wall of the groove and having rounded end faces closing the open ends of the groove and forming continuations of the external wall of the bearing to tilt therewith on the bearing wall of the housing, a rounded lug projecting from the central portion of the head and a spring pressed retainer in said housing receiving said lug in tiltable and rotatable relation for urging the head into bearing engagement with the groove and for urging the bearing into bearing engagement with the housing bearing wall whereby the stud will tilt in said bearing in a plane normal to the axis of the groove and will carry the bearing therewith when moved in all other planes to tilt and rotate on the housing bearing wall.

2. A joint structure comprising a housing having an internal bearing wall accommodating tilting and rotating movements, a bearing tiltable and rotatable on said bearing wall, a stud having a shank projecting through said bearing and an elongated head tiltable in one plane only in said bearing, said bearing having an elongated stud shank receiving opening with a major axis at right angles to the elongated stud head and accommodating tilting of the shank therein and a minor axis portion in contact with the stud shank, said stud head and shank at all times engaging said bearing for effecting comovement of the stud and bearing for all rotating movements of the stud and for all tilting movements of the stud except tilting in said one plane.

3. A joint construction comprising a housing, a fragmental ball-shaped seat tiltable and rotatable in said housing and having an elongated groove therein intersected by a hole extending through the seat, said hole having a major axis normal to the groove, and a stud projecting through said seat and having a cross head tiltable about its axis in said groove, said stud having a neck portion aligned with said hole and in contact with the minor axis portion of the hole to slide relative to the seat only in one plane while thrusting thereagainst for effecting comovement of the stud and seat in all other planes.

4. A joint construction comprising a housing having an internal bearing wall converging to an aperture and accommodating tilting and rotating movement, a bearing in said housing tiltable on said bearing wall, said bearing having an end face in said housing with a fragmentary cylindrical open-ended groove therein and an elongated hole through said bearing normal to the axis of the groove, a stud having a shank projecting freely through the aperture of the housing and projecting through the hole in said bearing, a cross head in said groove on the end of said stud shank, said cross head having a cylindrical bearing wall tiltable on said cylindrical wall of the groove, a rounded lug projecting from the central portion of the cross head and a spring-pressed bearing retainer in said housing receiving said lug in tiltable rotatable supporting relation.

5. A joint construction comprising a housing having an internal bearing wall converging to an aperture and accommodating tilting and rotating movement, a bearing in said housing tiltable on said bearing wall, said bearing having an end face in said housing with a fragmentary cylindrical open-ended groove therein and a transversely elongated hole through said bearing having a longitudinal axis perpendicular to the longitudinal axis of the groove, said hole having its major transverse axis normal to axis of the groove, a stud having a shank projecting freely through the aperture of the housing with a neck portion lying in said hole having a minor axis aligned with the major axis of the hole and a major axis sized for sliding bearing engagement with the minor axis part of the hole, and a cross head in said groove on the end of said shank.

6. A joint construction comprising a housing having an internal bearing wall converging to an aperture and accommodating tilting and rotating movement, a bearing in said housing tiltable on said bearing wall, said bearing having an end surface in said housing with a fragmentary cylindrical open-ended groove therein and a transversely elongated hole through said bearing perpendicular to the axis of the groove, said hole having its major transverse axis normal to the longitudinal axis of the groove, a stud having a shank projecting through the hole in the bearing in sliding bearing engagement with the elongated sides of the hole and pivotable in the hole in the direction of the longitudinal axis thereof, and a cross head in said groove on the end of said shank.

7. A joint construction comprising a housing, a bearing member tiltable and rotatable in said housing having a transversely elongated aperture therethrough and having an elongated groove in one surface thereof, the axis of said groove being normal to the longitudinal transverse axis of said elongated aperture, a stud projecting through said bearing and having a cross head tiltable in said groove, said stud having a neck portion passing through said elongated groove and in contact therewith to move relative thereto only in one plane while abutting thereagainst to effect co-movement of the bearing therewith in all other planes.

MATTHEW P. GRAHAM.

REFERENCES CITED

The following references are of record in the file of this patent:

UNITED STATES PATENTS

| Number | Name | Date |
|---|---|---|
| 771,457 | Bullard | Oct. 4, 1904 |
| 1,048,307 | Griffin | Dec. 24, 1912 |
| 1,845,095 | Nickelsen | Feb. 16, 1932 |
| 1,918,520 | Chitton | July 18, 1933 |
| 2,110,561 | Stephens | Mar. 8, 1938 |
| 2,178,206 | Katcher | Oct. 31, 1939 |